US012612962B1

(12) United States Patent
Palanisamy et al.

(10) Patent No.: US 12,612,962 B1
(45) Date of Patent: Apr. 28, 2026

(54) DIFFERENTIAL LOCK FOR INDEPENDENT WHEEL MOTORS

(71) Applicant: DEERE & COMPANY, Moline, IL (US)

(72) Inventors: Thirumal Appaian Palanisamy, Pune (IN); Zackary P. Sipper, Raleigh, NC (US); Stanley K. Hall, Godwin, NC (US); Tracy T. Lanier, Garner, NC (US); Shannon N. Oddo, Garner, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/204,728

(22) Filed: May 12, 2025

Related U.S. Application Data

(60) Provisional application No. 63/752,670, filed on Feb. 1, 2025.

(51) Int. Cl.
*F16H 48/20* (2012.01)

(52) U.S. Cl.
CPC ....... *F16H 48/20* (2013.01); *F16H 2048/205* (2013.01)

(58) Field of Classification Search
CPC ......... F16H 2048/205; F16H 2048/204; F16H 48/20
See application file for complete search history.

(56) References Cited

U.S. PATENT DOCUMENTS

| | | | |
|---|---|---|---|
| 9,377,774 B2 * | 6/2016 | Tajima | G05B 19/406 |
| 10,046,214 B2 * | 8/2018 | Schmidt | A63B 57/50 |
| 10,451,161 B2 * | 10/2019 | Garcia | F16H 48/34 |
| 10,927,934 B2 | 2/2021 | Zheng et al. | |
| 10,962,097 B2 * | 3/2021 | Dumas | B60K 17/16 |
| 12,097,772 B2 * | 9/2024 | Trainham | B62D 9/002 |
| 2008/0164084 A1 | 7/2008 | Bell et al. | |
| 2021/0347257 A1 | 11/2021 | Zalewski et al. | |
| 2023/0056052 A1 | 2/2023 | Ye et al. | |

FOREIGN PATENT DOCUMENTS

| | | |
|---|---|---|
| CN | 208544105 U | 2/2019 |
| KR | 20230130189 A | 9/2023 |

* cited by examiner

*Primary Examiner* — Huan Le

(57) ABSTRACT

Disclosed are implementations of devices, systems, and methods related to a differential lock for independent traction wheels. In one implementation, a vehicle is provided. The vehicle may include first and second traction wheels, a speed input, a steering input, and a differential lock input. It may further include a vehicle control unit with memory and a processor, capable of commanding differential speeds based on speed and direction information, detecting differential lock requests, and commanding equal speeds during lock requests. The control unit may also detect requests to stop the differential lock and limit vehicle speed during lock periods. The vehicle may have a front, rear, and two sides, with traction wheels located opposite each other. The speed input may be user-operated, and the steering input may be a sensor providing information about a steered wheel. The differential lock input may be user operated.

13 Claims, 5 Drawing Sheets

DIFFERENTIAL LOCK FOR INDEPENDENT WHEEL MOTORS

CROSS-REFERENCE TO RELATED APPLICATION

This application claims priority to U.S. Provisional Patent Application Ser. No. 63/752,670 filed Feb. 1, 2025, and entitled Differential Lock for Independent Wheel Motors. The entire contents of U.S. Provisional Patent Application Ser. No. 63/752,670 are hereby incorporated by reference.

TECHNICAL FIELD

The present disclosure relates generally to vehicles having independent wheel motors and more specifically to a differential lock for independent wheel motors.

BACKGROUND

Several vehicles include independent wheel motors. Those vehicles include, but are not limited to sand grooming vehicles, sometimes referred to as a utility rake, utility rake vehicle, bunker rake, or a bunker rake vehicle, which may be used to groom an area covered in sand or a similar material. Such machines may be used on golf courses to groom sand bunkers. Such machines may also be used in other applications, such as for a sports infield. The sand grooming vehicle may be a self-propelled machine that includes a rake, which may include one or more rake sections. The rake may be located at or near the rear of the sand grooming vehicle. Other vehicles having independent wheel motors may include, but are not limited to, mowers and construction equipment, including but not limited to wheel loaders.

SUMMARY

In one aspect of the invention, a vehicle is provided. The vehicle may include first and second traction wheels, at least one speed input configured to provide information related to the speed of the vehicle, at least one steering input configured to provide information related to the direction of travel of the vehicle, and at least one differential lock input. The vehicle may further include a vehicle control unit having at least one memory and at least one processor. The vehicle control unit may be operable to command differential speed of the first and second traction wheels based on the information related to the speed and direction of travel of the vehicle. It may also detect a differential lock input request from the differential lock input and command equal speed of the first and second traction wheels during the period in which the differential lock is requested. Additionally, the vehicle control unit may detect a request to stop the differential lock input request and/or limit the vehicle speed during the period in which the differential lock is requested. The vehicle may have a front, a rear, and two sides defining a side-to-side direction, with the first and second traction wheels located opposite each other in the side-to-side direction. The speed input may be a user input. The steering input may be a steering sensor that provides information related to a steered wheel. The differential lock input may also be a user input.

In another implementation, a vehicle is provided. The vehicle may have a front, rear, and two sides defining a side-to-side direction. The vehicle may include at least one steered wheel, at least one steering input configured to provide information related to the angle of the steered wheel, a first motor configured to drive a first traction wheel, and a second motor configured to drive a second traction wheel. The first and second traction wheels may be located opposite each other in the side-to-side direction. The vehicle may also include at least one speed input configured to provide information related to the speed of the vehicle and at least one differential lock input. The vehicle control unit, which may include at least one memory and at least one processor, may be operable to command differential speed of the first and second traction wheels based on the information related to the angle of the steered wheel and the speed of the vehicle. It may further detect a differential lock input request and command equal speed of the first and second traction wheels during the period in which the differential lock is requested. The vehicle may also include a network over which the vehicle control unit communicates with the steering input and speed input. Also included may be a first inverter configured to provide power to the first motor, and a second inverter configured to provide power to the second motor. The vehicle control unit may communicate with the steering input, speed input, first inverter, and second inverter via a controller area network. This vehicle may be a sand grooming vehicle that includes a rake configured to groom sand.

In yet another implementation, a computer-implemented method involves detecting information related to the speed of a vehicle, detecting information related to the direction of travel of the vehicle, commanding differential speed of two traction wheels based on the information related to the speed and direction of travel of the vehicle, detecting a differential lock input request, and commanding equal speed of the two traction wheels during the period in which the differential lock is requested. The method may also include limiting the speed of the vehicle during the period in which the differential lock is requested and/or detecting a request to end this period.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
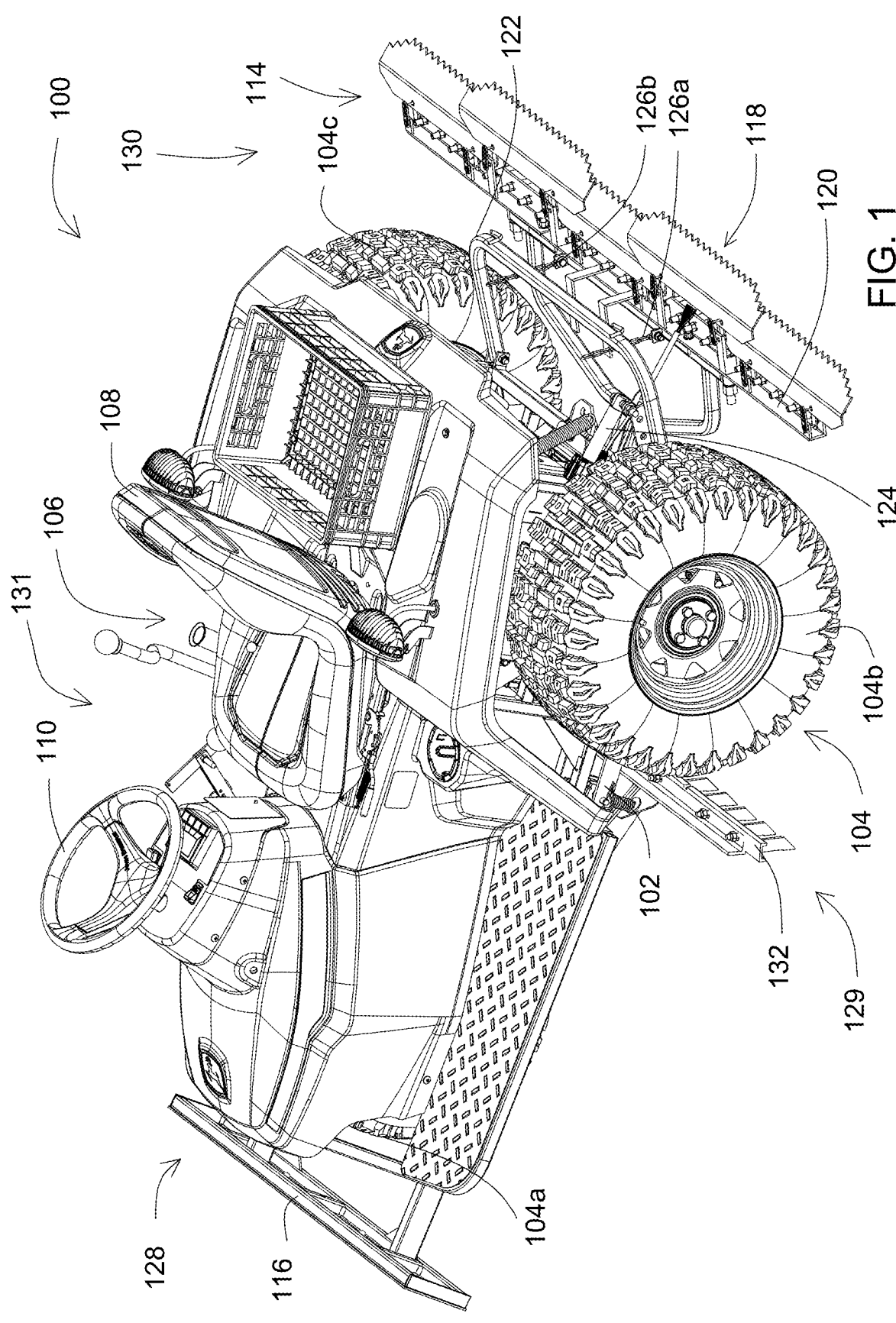
FIG. 1 is a perspective view of an implementation of a vehicle having independent wheel motors and an electronic differential lock of the present invention.

The following is a detailed description of one or more embodiments of technology, including systems, methods, and apparatuses, for a differential lock for independent wheel motors and vehicles including the same. In one example of an implementation, such a vehicle is a sand grooming vehicle, also called a utility rake. The differential lock may be an electronic differential lock, commanded by a vehicle control unit.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., may be used descriptively for the figures, and do not represent limitations on the scope of the disclosure, as defined by the appended claims. Moreover, sometimes terms such as "above," "below," "upward," "downward," "top," "bottom," etc., may also be used in connection with describing an apparatus as it is oriented when it sits on the ground in its customary operating mode. However, these terms are again used for description purposes and do not represent limitations on the scope of the disclosure, unless required by the claims. In addition, terms such as "forward", "rear", and "side" may be used relative to the typical direction of forward travel of an apparatus. These terms are used for description purposes and do not represent limitations on the scope of the disclosure, unless required by the claims.

Terms of degree, such as "generally", "substantially", or "approximately" are understood by those of ordinary skill to refer to reasonable ranges outside of a given value or orientation, for example, general tolerances or positional relationships associated with manufacturing, assembly, and use of the described embodiments.

Vehicles may have a plurality of ground engaging members, such as wheels. In some such vehicles, two or more of the plurality of ground engaging members may be driven independently, such as by independent motors. Moreover, two or more of the ground engaging members may be located in substantially the same side-to-side line. Such two or more of the ground engaging members may operate cooperatively to effect movement of the vehicle, such as movement directed by an operator and/or the vehicle. Such two or more ground engaging members may be traction ground engaging members, such as traction wheels.

In one example of an implementation of the invention, referring to FIG. 1, an implementation of a sand grooming vehicle 100 is provided. The sand grooming vehicle 100 may include a frame 102 (best seen in FIG. 3) supported by one or more ground engaging members 104. In the illustrated embodiment, three ground engaging members 104 are provided: a front wheel 104a, a left rear wheel 104b, and a right rear wheel 104c. Sand grooming vehicle 100 may include a front 128 and a rear 130. Sand grooming vehicle 100 may further include a left side 129 and a right side 131, which define a side-to-side direction. Sand grooming vehicle 100 may further include a rake 114, illustrated as extending from at or near the rear 130 of the sand grooming vehicle 100. Moreover, the sand grooming vehicle 100 may include a blade 116, such as at or near the front 128 of the sand grooming vehicle 100. Sand grooming vehicle 100 may include a mid-rake 132.

Figure 2:
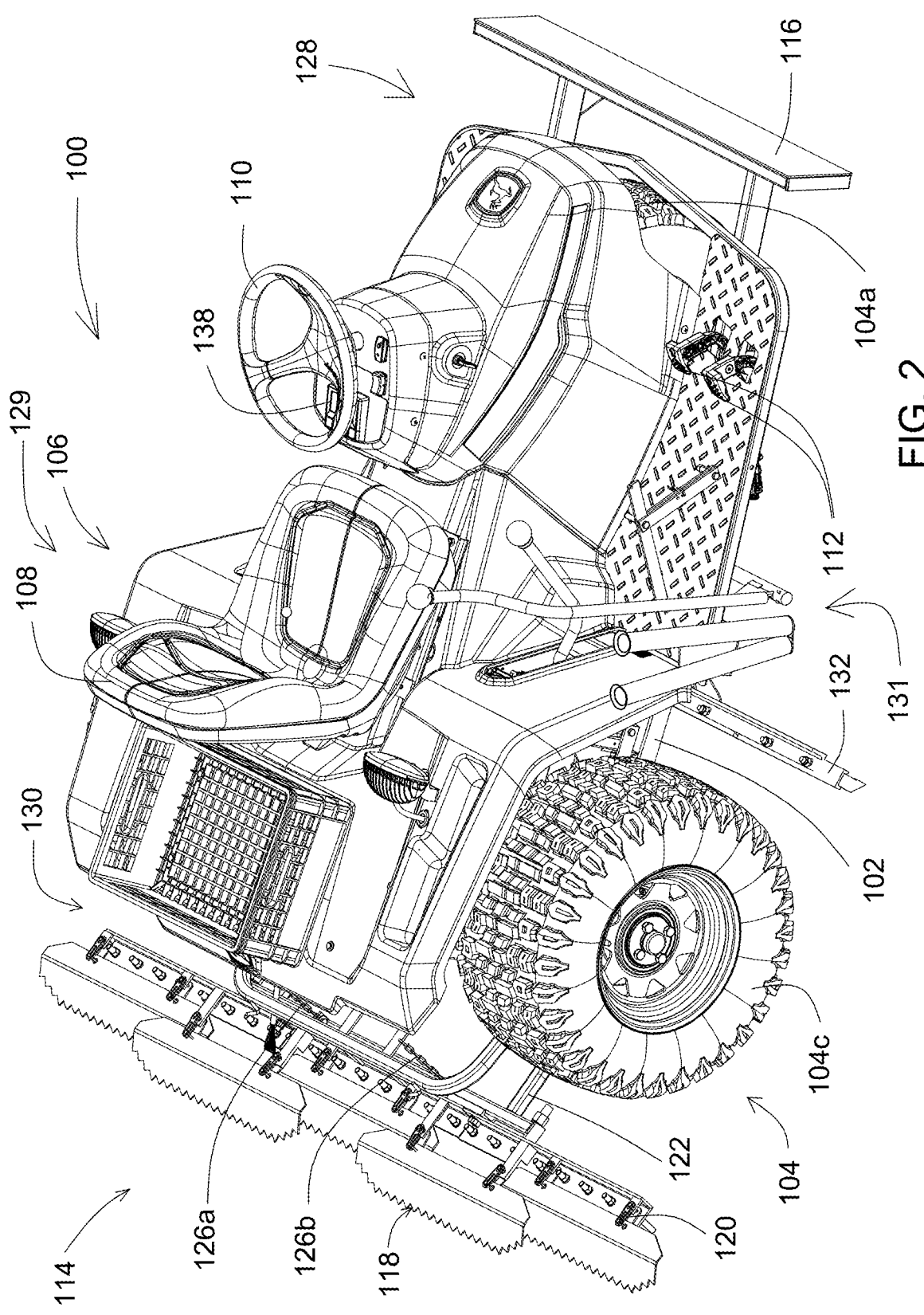
FIG. 2 is a perspective view of the vehicle of FIG. 1.

Referring to FIG. 2, the sand grooming vehicle 100 may include an operator station 106. The illustrated operator station 106 may include a seat 108, at least one steering device 110, and one or more user input devices. It will be understood by one of skill in the art that the terms "operator" and "user" may be used interchangeably herein. In the illustrated implementation, the steering device 110 is a steering wheel; however, one or more steering devices of any type may be used. For example, one or more steering levers may be used. Moreover, the operator station 110 may include at least one foot pedal 112, such as a foot pedal that is used by an operator to request an increase or decrease in the speed of the sand grooming vehicle 100 and/or a foot pedal to activate a brake. Also included may be foot pedals for the operator to request forward or reverse movement by the vehicle's traction system. The operator station may also include one or more user-actuated controls to control one or more features of the sand grooming vehicle 100.

To that end, operator station 106 may include a screen 138.

Figure 3:
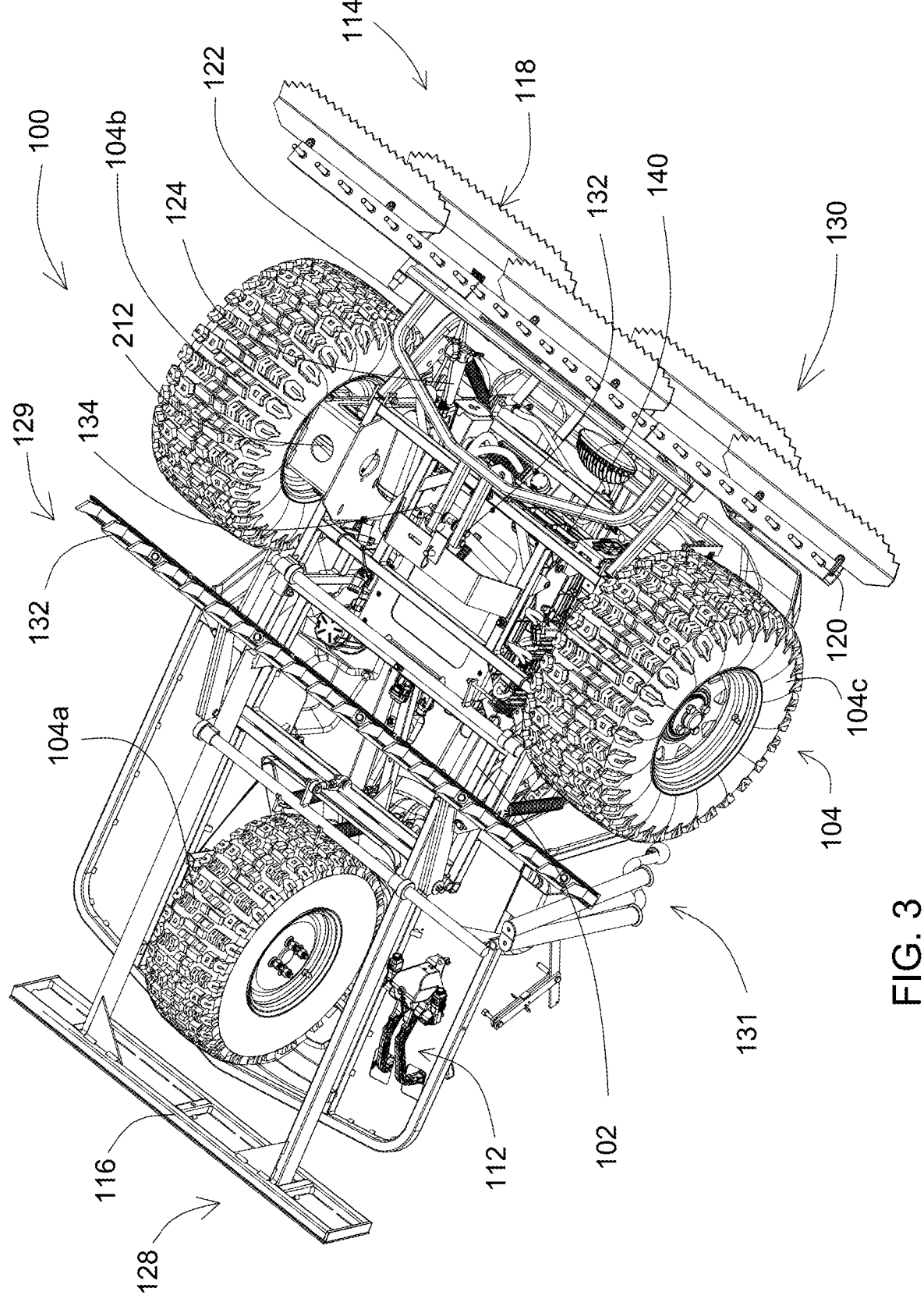
FIG. 3 is a perspective view showing the underside of the vehicle of FIGS. 1 and 2.

A sand grooming vehicle 100 of the present invention may include a power source. As shown in FIG. 3, the illustrated power source is a battery 140. Referring to FIG. 3, a perspective view of the underside of a sand grooming vehicle 100 of the present invention is shown. Shown is the rake 114, which may include one or more rake sections 118. The rake sections 118 may extend from a rake frame 120. The rake frame 120 may be joined to one or more rake supports 122. Rake support(s) 122 may be directly or indirectly connected to frame 102. Rake supports 122 may be configured to be movable. For example, rake supports 122 may be configured to be pivotable with respect to frame via joints 132, 134. Also shown in FIG. 3 are wheels 104a, 104b, 104c. Left rear wheel 104b is associated with left traction motor 212. Right rear wheel 104c is associated with right traction motor 214.

In the illustrated implementation shown in FIGS. 1-3, wheel 104a is a steered wheel that provides direction to the vehicle. Input on the direction of the steered wheel, and accordingly the vehicle, may be via user input such as via steering wheel 110 or the vehicle itself, such as in the case of an autonomous or semi-autonomous vehicle. Moreover, wheels 104b and 104c are traction wheels to provide traction for the vehicle 100. Traction wheels 104b, 104c may each be associated with a traction motor 212, 214, respectively, as noted above.

Traction motors 212, 214 may receive power from a power source. Power source may be any type, including but not limited to a battery, internal combustion engine via an alternator, hybrid system, or a combination thereof. Traction motors 212, 214 may generate the movement necessary to rotate wheels 104b, 104c. In some examples of implementations, one or more traction motors 212, 214 may receive power, such as current, via an inverter. Inverters 216, 218 may serve to provide torque to the wheels 104b, 104c, respectively.

Figure 4:
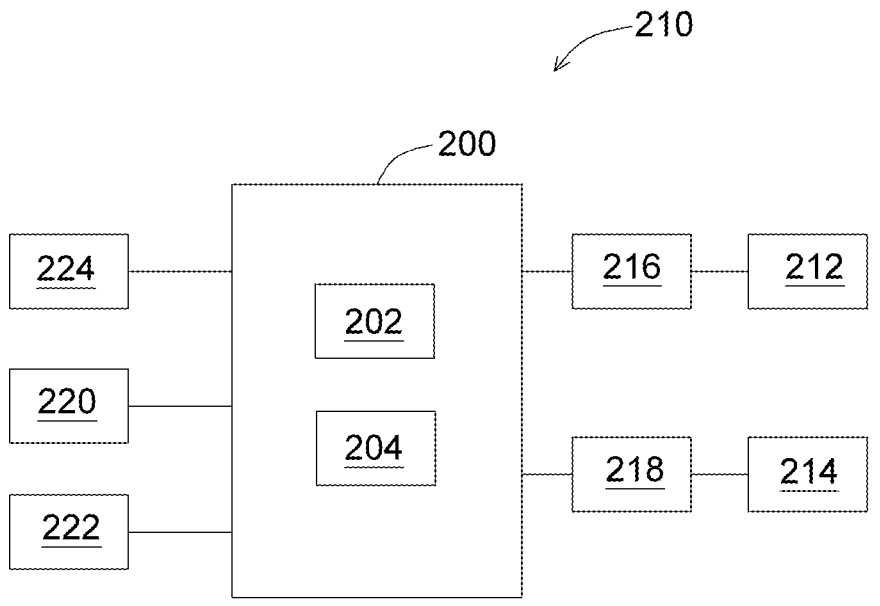
FIG. 4 is a diagram of a portion of an implementation of a sand grooming vehicle of the present invention.

A sand grooming vehicle 100 of the present invention may have one or more electronic control systems or components. Referring to FIG. 4, a first implementation of an exemplary control system 210 of a sand grooming vehicle 100 of the present invention is shown. Control system 210 may include a vehicle control unit (sometimes "VCU") 200. The VCU 200 may be configured to electronically control the operation of one or more components of sand grooming vehicle 100. VCU 200 may be any suitable processor-based device known in the art, such as a computing device or any suitable combination of computing devices. The VCU 200 may include at least one memory 202 and at least one processor 204. The memory 202 and the processor 204 may be communicatively coupled. The memory 202 may communicate with the processor 204 and may be used to store programs and other software and information (such as in the form of data or instructions). The processor 204 may be operable to execute programs and software and receive information and send information to the memory 202. Although a single memory 202 and a single processor 204 are illustrated, in some implementations, a plurality of memories, processors, or both may be used. Although the processor 204 and memory 202 are shown as being local components of the VCU 200, one or both of the processor 204 and memory 202 may be located remotely. VCU 200 may be configured to perform a variety of computer-implemented functions, including those described herein.

As discussed above, vehicle 100 may also include a plurality of traction motors. The illustrated implementation includes two traction motors 212, 214. In one or more implementations VCU 200 may be directly in communication with motors 212, 214. The illustrated implementation includes a plurality of inverters 216, 218. Each inverter 216, 218 is in communication with VCU 200 and one motor 212, 214, respectively, as shown in FIG. 4. Other configurations may be used without departing from the scope of the invention. Inverters 216, 218 may be configured to provide power to motors 212, 214.

In the illustrated implementation, VCU 200 is also in communication with at least one steering input 220. Steering input 220 may be any type related to an angle at which the vehicle 100 is steered. In some implementations, steering input 220 may measure the angle at which a steered wheel 104a is directed. In other implementations, steering input 220 may provide a request to steer a steered wheel. In the illustrated implementation, steering input 220 may be a steering sensor, which is located at steered wheel 104a to measure the angle at which steered wheel 104a is directed. In the illustrated implementation, the angle at which steered wheel 104a is directed to move is requested mechanically by a user via the steering wheel 110. The command is transferred from the steering wheel 110 to steered wheel 104a via a steering assembly (not shown). In one or more examples of implementations, steering sensor may be a rotational sensor configured to measure the rotation of a shaft to which steered wheel 104a is operationally engaged. Other examples of sensors include, but are not limited to, an electric sensor used in association with an electric steering assembly. Such an electric sensor may be configured to receive feedback from an electric motor. In other examples of sensors, the rotational motion of the shaft may be translated to linear motion and a linear or other sensor may be used. In implementations using hydraulic steering, a linear motion sensor may be used.

In one or more other examples of implementations, steering sensor may be associated with steering wheel 110 and measure the angle at which steering wheel 110 is steered by a user. Steered wheel 104a may then be commanded by VCU 200. Steering input 220 may also be a command from a vehicle, such as from one or more vehicle control units, for example as in the case of a vehicle utilizing a path plan, such as an autonomous or semi-autonomous vehicle. As noted above, in the illustrated implementation, changes in direction to steered wheel 104a are implemented mechanically via a mechanical steering assembly. Mechanical steering assembly receives requests to change the steering direction via one or more steering devices such as steering wheel 110, which may be operated by a user. In the illustrated implementation, steering input is a steering sensor 220 that measures the angle of steered wheel 104a.

Referring again to FIG. 4, speed input 224 is also shown. Speed input 224 may provide information to VCU 200 regarding a desired speed of the vehicle. In one or more implementations, speed input 224 may be a user input, such as a foot pedal, button, switch, joystick, touch screen, or any other user input wherein a user may indicate a desired speed. In one or more implementations, speed input 224 may originate from the vehicle 100, such as in the VCU 200. VCU 200 may use information from speed input 224 to determine the speed to command one or more of wheels 104a, 104b, 104c to travel. As described above, in the illustrated implementation, wheel 104a is a steered wheel, while wheels 104b and 104c are traction wheels. Moreover, in the illustrated implementation 104b and 104c are located opposite each other in the side-to-side direction and may operate in coordination with each other. Such coordination may be determined and commanded by VCU 200.

VCU 200 may command action(s) by the traction wheels 104b, 104c. In one or more implementations, VCU 200 commands the speed of each traction wheel 104b, 104c. In the illustrated implementation, VCU 200 commands the speed of the traction wheels 104b, 104c via inverters 216, 218 and motors 212, 214; however, other configurations may be used without departing from the scope of the invention. In the illustrated implementation, wheels 104b and 104c, which are the rear wheels, are traction wheels and are not steered wheels. Nonetheless, VCU 200 may also command action(s) by wheels 104b and 104c related to the steered direction of the vehicle 100. For example, in one or more implementations, under one or more scenarios, the VCU 200 may command differential speed of the rear wheels 104b, 104c, such as via inverters 216, 218 and/or motors 212, 214. For example, when vehicle 100 is turning, an inner traction wheel 104b or 104c may be commanded to travel at a slower speed than outer traction wheel 104b or 104c, which may be commanded to ravel at a greater speed than the inner traction wheel 104b or 104c. Moreover, in one or more implementations, when vehicle 100 is traveling straight, left 104b and right 104c traction wheels may be commanded to travel at the same speed.

In the illustrated implementation of FIG. 4, differential lock input 222 is also shown. From time to time during the operation of vehicle 100, it may be beneficial to command the same speed to both traction wheels 104b and 104c at a time when the VCU 200 would typically command different speeds to the traction wheels 104b and 104c.

Differential lock input 222 may be any type of input. In one or more implementations, differential lock input 222 may be a user-operated input. Examples of user-operated inputs may include, but are not limited to, a button, switch, joystick, foot pedal, touch screen, or any other user input wherein a user may indicate a request to turn on a differential lock feature. In one or more implementations, differential lock input 222 is not a user-operated input and may be activated by the vehicle itself, such as one or more vehicle control units, such as VCU 200.

Referring again to FIG. 4, in the illustrated implementation, VCU 200 is in communication with steering sensor 200, differential lock input 222, speed input 224, inverter 216, and inverter 218. Electric components of the vehicle 100, including but not limited to steering sensor 200, differential lock input 222, speed input 224, inverter 216, and inverter 218, may be in communication via a network. In one or more implementations, a CAN (controller area network) may be used.

Figure 5:
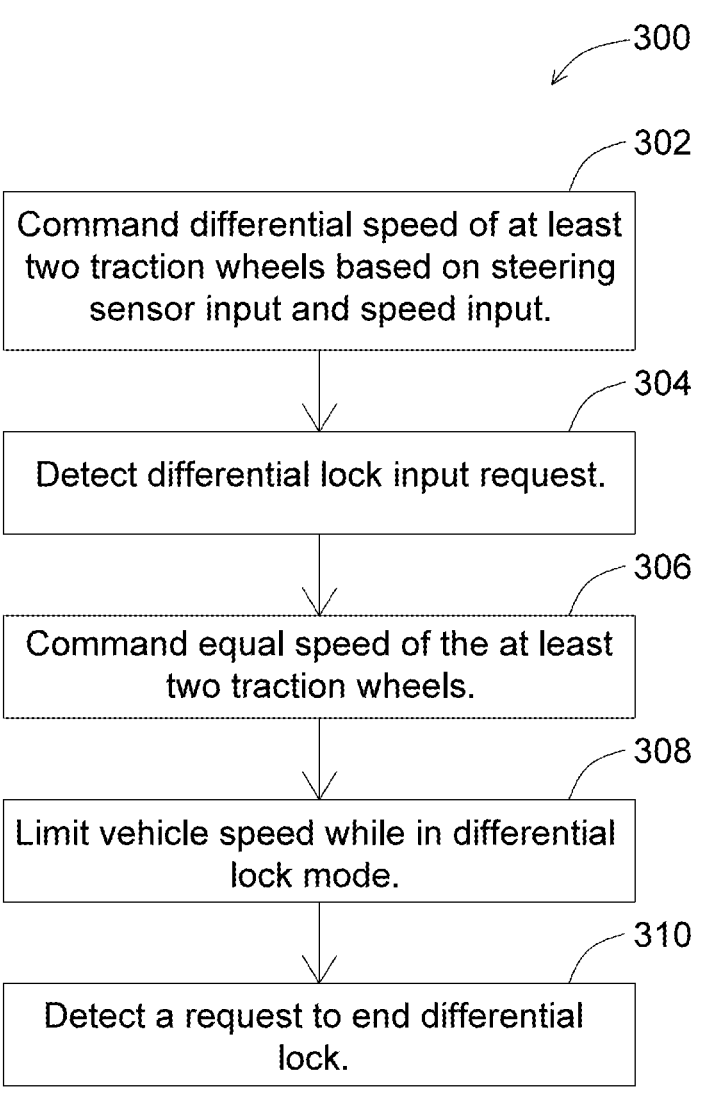
FIG. 5 is flow chart of an implementation of a method of controlling at least two traction wheels via an electronic differential lock of the present invention.

Referring to FIG. 5, in one or more implementations of the invention, a method 300 of controlling at least two traction wheels via an electronic differential lock may be provided. A method 300 of the present invention may include commanding differential speed of at least two traction wheels based on steering sensor input and speed sensor input, as shown in block 302. Moreover, a differential lock input request may be detected 304. Such a request may be user-inputted or originate from vehicle 100 such as VCU 200. Shown in block 306, the method may further include commanding equal speed of the at least two traction wheels. Optionally, while vehicle 100 is in differential lock mode, the speed of the vehicle may be limited, as shown in block 308. In one or more implementations, speed may be limited to a working speed rather than a transport speed. In one or more implementations, speed may be limited to 1 mph, 2 mph, 3 mph, 4 mph, 5 mph, 6 mph, 7 mph, 8 mph, 9 mph, or 10 mph. In one or more implementations, the maximum speed during differential lock mode may be configurable by a user, such as via a user input. In one example of an implementation, a user input to configure a maximum speed during differential lock mode may be via a screen such as a touchscreen. Furthermore, a method 300 of the present invention may include detecting a request to end differential lock, as shown in block 310. Such a request may be user-inputted or come from the vehicle 100 itself, such as VCU 200.

In one or more implementations, method 300 may be computer-implemented. In such computer-implemented methods, VCU 200 may carry out one or more steps of method 300. In one or more implementations, when differential lock mode is enabled, a differential of zero may be forced into the VCU 200 logic as the speed differential. Other methods of commanding equal speed or torque by two or more traction wheels may be used without departing from the scope of the invention.

The present invention may be beneficial in several scenarios. In one example related to a golf course bunker, bunkers are typically sloped. Vehicle 100 may need additional traction when getting out of a bunker. When additional traction is needed, the differential lock can serve to provide the same speed or torque to each wheel 104b and 104c, which may result in increased total traction. Said another way, the differential lock may provide zero differential speed. In one or more examples of implementations, increased traction may result for the wheel that would otherwise be commanded to travel at a slower speed, which increases overall traction. In other examples wherein a differential lock may be desirable, blade 116 may be used to push sand. Increased traction may be beneficial in sand pushing operations, including but not limited to when sand is pushed uphill, such as up the slope of a golf course bunker. In one or more implementations, the differential lock resulting in increased traction may be beneficial when turning during the aforementioned operations. In addition in one or more implementations, the differential lock may be beneficial any time one of the traction wheels 104b or 104c loses traction and slips.

The present invention is applicable to vehicles having two or more wheels. For example, vehicles of the present invention may include two, three, four, five, six, seven, eight, nine, ten, eleven twelve, thirteen, fourteen, fifteen, sixteen, seventeen, eighteen, or more wheels, any two or more of which may be traction wheels. The present invention is applicable to vehicles having an operator, also called a user, as well as autonomous or semi-autonomous vehicles. Methods of the present invention may be computer-implemented, such as via one or more vehicle control units.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A vehicle, comprising:
   first and second traction wheels;
   at least one speed input configured to provide information related to a speed of said vehicle;
   at least one steering input configured to provide information related to a direction of travel of said vehicle;
   at least one differential lock input;
   a vehicle control unit including at least one memory and at least one processor, said vehicle control unit operable to:
     command differential speed of said first and second traction wheels based on said information related to a speed of said vehicle and said information related to a direction of travel of said vehicle;
     detect a differential lock input request from said at least one differential lock input;
     command equal speed of said first and second traction wheels during a period of time in which said differential lock is requested; and
     limit a vehicle speed during said period of time in which said differential lock is requested.

2. The vehicle of claim 1, wherein said vehicle control unit is further operable to:
   detect a request to stop said differential lock input request.

3. The vehicle of claim 1, further comprising a front, a rear, and two sides, said two sides defining a side-to-side direction and wherein said first and second traction wheels are located opposite each other in the side-to-side direction.

4. The vehicle of claim 1, wherein said speed input is a user input.

5. The vehicle of claim 1, wherein said steering input is a steering sensor.

6. The vehicle of claim 5, wherein said steering sensor provides information related to a steered wheel.

7. The vehicle of claim 1, wherein said differential lock input is a user input.

8. A vehicle having a front, rear, and two sides defining a side-to-side direction, comprising:
   at least one steered wheel;
   at least one steering input configured to provide information related to an angle of said steered wheel;
   a first motor configured to drive a first traction wheel;
   a second motor configured to drive a second traction wheel;
   said first and second traction wheels located opposite each other in the side-to-side direction
   at least one speed input configured to provide information related to a speed of said vehicle;

at least one differential lock input;

a vehicle control unit including at least one memory and at least one processor, said vehicle control unit operable to:

command differential speed of said first and second traction wheels based on said information related to an angle of said steered wheel and said information related to a speed of said vehicle;

detect a differential lock input request from said at least one differential lock input;

command equal speed of said first and second traction wheels during a period of time in which said differential lock is requested; and limit a vehicle speed during said period of time in which said differential lock is requested.

9. The vehicle of claim 8, further comprising a network over which said vehicle control unit communicates with said at least one steering input and said at least one speed input.

10. The vehicle of claim 9, further comprising a first inverter configured to provide power to said first motor and a second inverter configured to provide power to said second motor.

11. The vehicle of claim 10, wherein said vehicle control unit communicates with said at least one steering input, said at least one speed input, said first inverter, and said second inverter via a controller area network.

12. The vehicle of claim 11, wherein said vehicle is a sand grooming vehicle further comprising a rake configured to groom sand.

13. A computer-implemented method, comprising:

detecting information related to a speed of a vehicle;

detecting information related to a direction of travel of said vehicle;

commanding differential speed of two traction wheels based on said information related to a speed of said vehicle and said information related to a direction of travel of said vehicle;

detecting a differential lock input request;

commanding equal speed of said two traction wheels during a period of time during which said differential lock is requested; and at least one of limiting the speed of said vehicle during said period of time during which said differential lock is requested; and detecting a request to end said period of time during which said differential lock is requested.

\* \* \* \* \*